(12) United States Patent
Gary

(10) Patent No.: US 7,111,182 B2
(45) Date of Patent: Sep. 19, 2006

(54) THREAD SCHEDULING MECHANISMS FOR PROCESSOR RESOURCE POWER MANAGEMENT

(75) Inventor: Scott P. Gary, Santa Barbara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 490 days.

(21) Appl. No.: 10/652,384

(22) Filed: Aug. 29, 2003

(65) Prior Publication Data

US 2005/0050369 A1     Mar. 3, 2005

(51) Int. Cl.
*G06F 1/26* (2006.01)

(52) U.S. Cl. ............... 713/324; 713/320; 713/330

(58) Field of Classification Search ........ 713/300, 713/320, 324, 330, 340
See application file for complete search history.

(56) References Cited

U.S. PATENT DOCUMENTS

| | | | | |
|---|---|---|---|---|
| 4,780,714 A | * | 10/1988 | Moustakas et al. | 340/825.5 |
| 4,926,458 A | * | 5/1990 | Reger et al. | 379/27.01 |
| 5,442,305 A | * | 8/1995 | Martin et al. | 326/30 |
| 5,875,345 A | * | 2/1999 | Naito et al. | 713/323 |
| 6,209,088 B1 | * | 3/2001 | Reneris | 713/1 |
| 6,292,322 B1 | * | 9/2001 | Haraguchi | 360/69 |
| 6,336,161 B1 | * | 1/2002 | Watts | 711/103 |
| 2002/0049920 A1 | * | 4/2002 | Staiger | 713/340 |
| 2003/0149904 A1 | * | 8/2003 | Kim | 713/330 |
| 2004/0044859 A1 | * | 3/2004 | Wong | 711/156 |
| 2004/0153762 A1 | * | 8/2004 | Flynn et al. | 714/15 |
| 2005/0094479 A1 | * | 5/2005 | Kim et al. | 365/232 |
| 2005/0268119 A9 | * | 12/2005 | Guha et al. | 713/300 |

* cited by examiner

*Primary Examiner*—Thomas Lee
*Assistant Examiner*—Malcolm Cribbs
(74) *Attorney, Agent, or Firm*—Robert D. Marshall, Jr.; W. James Brady; Frederick J. Telecky, Jr.

(57) ABSTRACT

A real-time operating system runs on a processor and dynamically manages the power state of individual circuits or resources with the processor. Thus, if a particular circuit is not needed, power to that circuit can be disabled. If a circuit is shut down, any configuration information or other type of data can be saved before powering off the circuit. Power can be re-enabled to the circuit on a responsive or predictive basis and the configuration information and/or data (collectively referred to as "state" information) can be reloaded into the circuit.

21 Claims, 3 Drawing Sheets

THREAD SCHEDULING MECHANISMS FOR PROCESSOR RESOURCE POWER MANAGEMENT

CROSS-REFERENCE TO RELATED APPLICATIONS

Not applicable.

BACKGROUND OF THE INVENTION

1. Technical Field

The present subject matter relates to power management in a processor.

2. Background Information

Power efficiency is a significant requirement across a broad range of systems, ranging from small portable devices to rack-mounted server systems. Even in systems for which high performance is desired, power efficiency still may be a concern. Power efficiency is effected both by hardware design and component choice as well as software-based run-time power management techniques.

A complementary metal oxide semiconductor ("CMOS") circuit experiences both "active" and "static" power consumption. Active power consumption occurs when the circuit is actively switching from one logic state to another. Active power consumption is caused both by "switching" current and "through" current (current that flows when both P and N-channel transistors are both on momentarily). Static power consumption results from reverse bias leakage and occurs even when the circuit is not actively switching. The total power consumption of a CMOS circuit is the sum of both active and static power consumption.

With conventional CMOS process technology, power savings may occur by simply gating off the clocks. In such circuits in this state, active power consumption falls to zero and the resulting leakage becomes relatively minimal. However, in more recently developed CMOS technology, the size of the transistors advantageously has been reduced, but with an undesirable increase in leakage current. As a result, some CMOS circuits experience undesirably high current draw even with all clocks gated off Various hardware and software techniques have been employed to help manage the power state of a circuit or a complete system. While some of these techniques may be satisfactory, there still remains a need for improvement in the power management of individual semiconductor devices (e.g., processors), particularly for semiconductor devices having relatively high leakage currents when active power consumption is reduced.

BRIEF SUMMARY

In general, the embodiments described herein are directed to an operating system that runs on a processor and that dynamically manages the power state of individual circuits or resources within the processor. If a particular circuit within the processor is not needed, power to that circuit is disabled. If a circuit is to be shut down, any configuration information or other type of data associated with that circuit is saved before powering off the circuit. Power can be re-enabled to the circuit on a responsive or predictive basis and the configuration information and/or data (collectively referred to as "state" information) can be reloaded into the circuit.

In some embodiments a method comprises receiving a request for a resource within a semiconductor device, enabling power to the resource in response to receiving said request if power is not already enabled to the resource, determining whether state information should be restored to the resource, and restoring the state information to the resource after enabling power if the state information should be restored.

In other embodiments, a method comprises, before a need for a resource arises, determining that the resource will be needed, enabling power to the resource if power is not already enabled to the resource, determining whether state information should be restored to the resource, and restoring the state information to the resource after enabling power if the state information should be restored.

In still other embodiments, a system comprises a processor, a plurality of resources contained in the processor, and a power manager that runs on the processor and that receives a request for use of a resource, enables power to the resource in response to receiving said request if power is not already enabled to the resource, determines whether state information should be restored to the resource, and restores the state information to the resource after enabling power if the state information should be restored.

In accordance with other embodiments, a system comprises a processor, a plurality of resources contained in the processor, and a power manager that runs on the processor and that, before a need for a resource arises, determines that the resource will be needed and the power manager also enables power to the resource if power is not already enabled to the resource, determines whether state information should be restored to the resource, and restores the state information to the resource after enabling power if the state information should be restored.

Various embodiments of the invention also may be implemented as a storage medium that contains software and, when executed by a processor, the software dynamically manages power within the processor, the processor comprising a plurality of circuits. The software comprises instructions that determine when a circuit within the processor is needed for use, instructions that determine whether the circuit already has power enabled to the circuit, and instructions that cause power to be enabled to the circuit if power is not already enabled to the circuit.

Notation and Nomenclature

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

BRIEF DESCRIPTION OF THE DRAWINGS

For a more detailed description of the preferred embodiments of the present invention, reference will now be made to the accompanying drawings, wherein.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
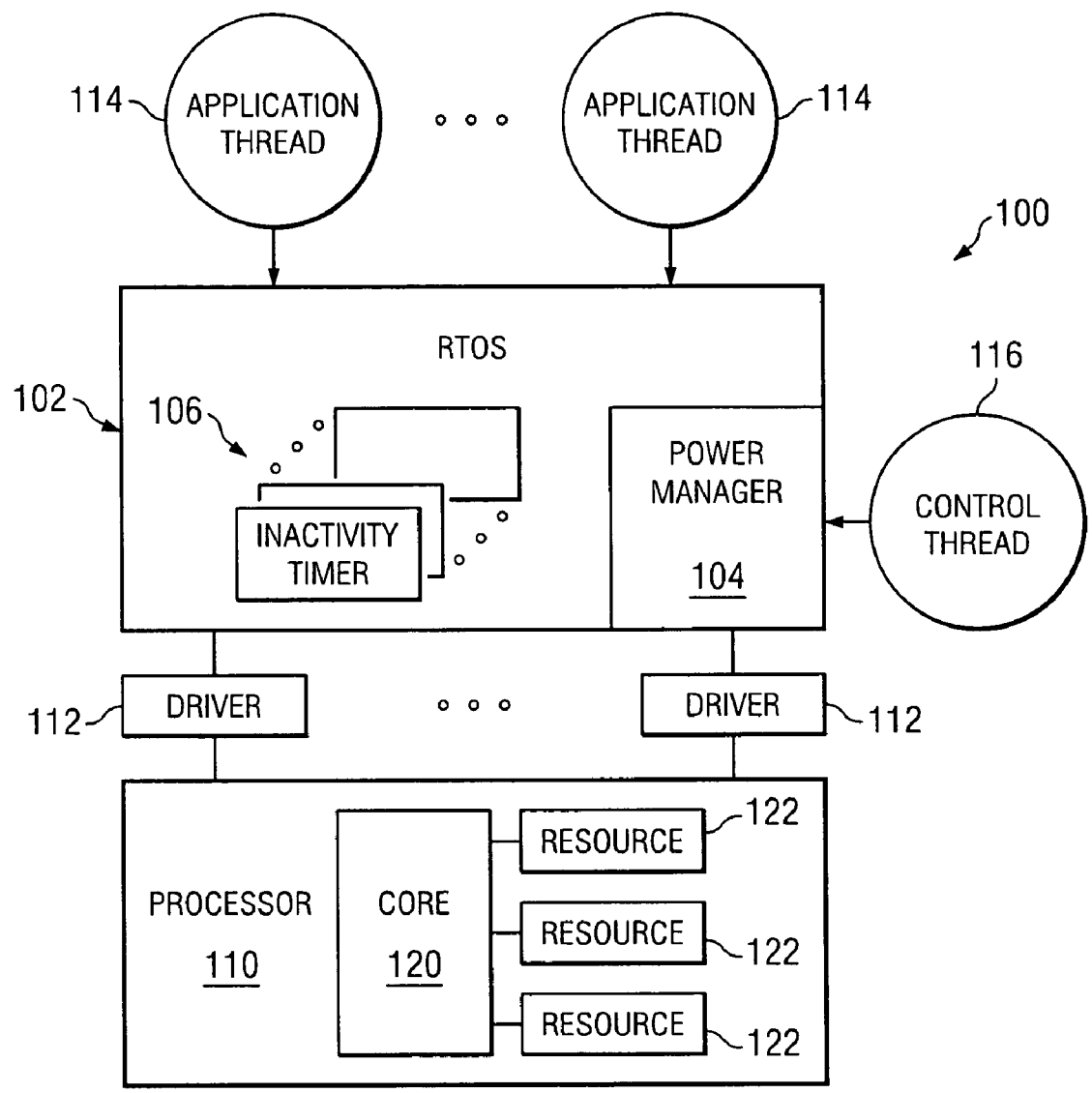
FIG. 1 shows a logical architecture of an embodiment of a system that implements the power management techniques described herein.

FIG. 1 shows a logical architecture of an embodiment of a system 100 comprising a real-time operating system ("RTOS") 102, a processor 110 (or other type of semiconductor device), various drivers 112 and application threads 114. Further, power manager 104 preferably is included as part of the RTOS 102 and, as such, comprises software. A separate control thread 116 is used for the operation of the power manager 104. The RTOS 102 also may include or have access to one or more inactivity timers 106.

The processor 110 includes, or has access to, a plurality of resources. In FIG. 1, the processor 110 preferably comprises a core 120 coupled to a plurality of resources 122. The resources 122 may comprise circuits contained with the processor 110. For example, the resources may include memory, input/output ports, analog-to-digital ("ADC") channels, and other resources that dynamically (i.e., during run-time) may be turned on and off on an individual basis. In the preferred embodiment, turning a resource "off" involves completely disabling power to the resource, not simply gating off clocks to the resource. By turning off a resource in this way, leakage current in the resource becomes zero. Thus, in the preferred embodiment, individual resources within the processor 110 may be selectively and dynamically powered on and off. In this way, a processor resource that is not needed can be selectively powered off while other resources are selectively powered on.

The power manager 104 implements some or all of the functionality described below to power on and off individual resources within the processor 110. In general, the operation of power manager 104 is transparent to applications running on the processor. A resource (or multiple resources) may be powered off based on one or more criteria. For instance, the inactivity timers 106 may be configured to monitor one or more resources individually for conditions of inactivity. Thus, if a particular resource has been inactive for more than the period of time programmed into the associated inactivity timer, the power manager 104 causes the resource to power down. Further, a user can program a portion of memory (not specifically shown) with information as to which of the processor resources will be used and which will not be used. Using this information, during initialization the power manager 104 preferably prevents power from being enabled to those resources that will not be used, as well as turns off resources that are powered on by default that the application will not use.

In at least some embodiments, threads in which applications run may carry information regarding the power resource requirements. In these embodiments, a thread may include power resource assignments, restoration boundaries, and power ready state information. More specifically, a thread may include the following information:

a. Power resource assignments, meaning the power 'domains' it is dependent upon (a 'domain' being a memory bank or group of peripherals that are jointly powered ON or OFF), or, when power to individual banks/peripherals is individually-gateable, the specific banks/peripherals that the thread requires;

b. Restoration boundaries for memory state that needs to be restored (e.g., a thread may only require 100 bytes out of a 64 Kbyte memory bank; the 'boundaries' define this 100 byte region); and c. Power ready state information that may be a flag to indicate whether all of the thread's dependent resources are currently powered, and the necessary thread state has been restored.

This information can be configured statically for the thread at design time, or dynamically registered with the power manager if the thread is dynamically created at runtime.

Some resources may have state information ("state") that should be saved, if desired, when the resource is powered off by the power manager 104. State information comprises any type of configuration information or data. For example, state information pertaining to a memory device may comprise the current data contents of the memory. Other types of resources may be configurable and thus various items of configurations (e.g., speed, number of channels, etc.) may comprise the resource's state information. Once the power manager 104 determines that it is appropriate to power off a resource, the resource's state information is saved to a storage medium (not specifically shown) that is not powered off when the resource is powered. Once the resource's state is saved, the resource can be powered off.

Figure 2:
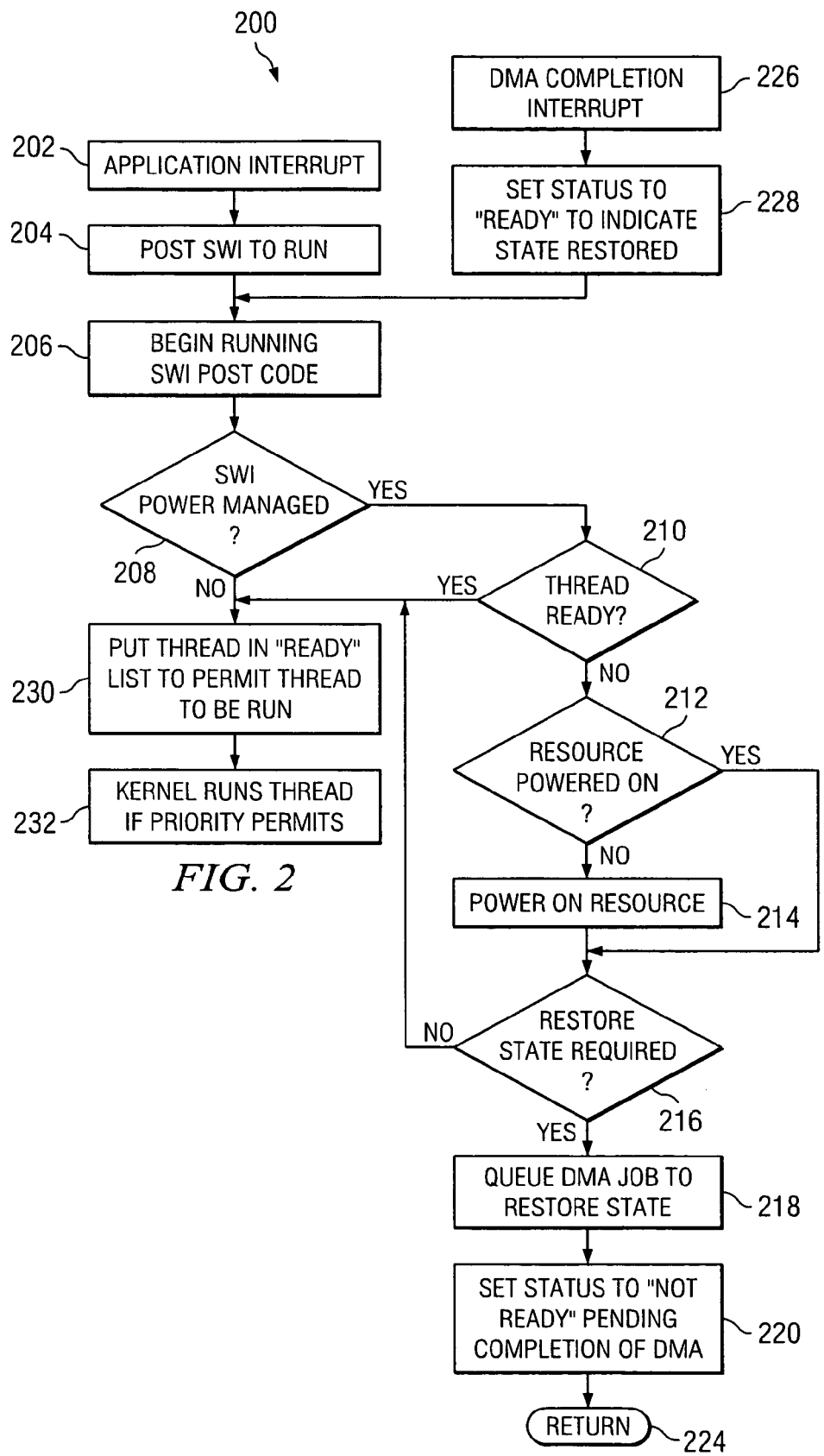
FIG. 2 shows a flow chart depicting the operation of software that implements a responsive power management mode.
Figure 3:
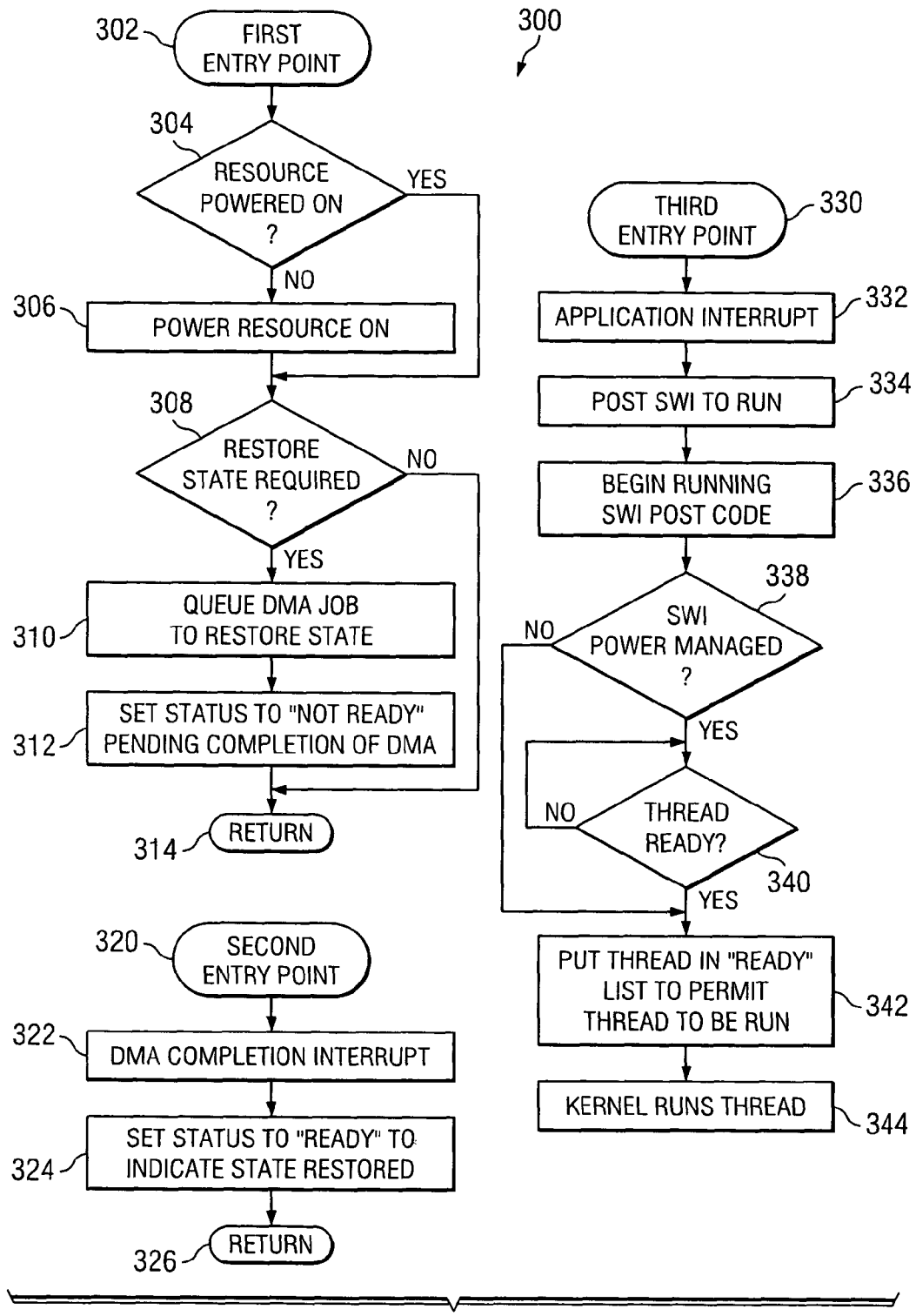
FIG. 3 shows a flow chart depicting the operation of software that implements a predictive power management mode.

Once a processor resource is powered off, a mechanism to power back on the resource is needed. The power manager 104 preferably is capable of powering on a resource in accordance with any of multiple modes including, without limitation, a responsive mode and a predictive mode. In the responsive mode, the power manager 104 powers a resource back on in response to a request for that resource. In the predictive mode, the power manager begins the process of enabling power to a resource before an application requests access for the resource. The predictive mode may also permit state information previously saved to be restored to the resource before the use of the resource is requested or needed. FIG. 2 depicts the operation of the power manager 104 in the responsive mode. FIG. 3 depicts the operation of the power manager in the predictive mode. The power manager preferably implements the logic depicted in the flow charts of FIGS. 2 and 3.

Referring now to FIG. 2, flow chart 200 begins with an application interrupt at block 202. The application interrupt is asserted to request an application-specific action that may require the power manager 104 to power on a particular resource. In block 204, a software interrupt ("SWI") is posted to run. In response, the processor 110 begin to run "SWI POST" code (which may be included in RTOS 102) at block 206. The SWI POST code determines whether the resource is power managed (decision block 208). Non-power managed resources are generally powered on during run-time and not subject to the selective processor resource power management scheme described herein. Other resources are power managed and thus can be selectively powered on and off as described herein.

If the processor resource is not power managed (which indicates to the SWI POST code that the resource is already powered on), then control passes to block 230 in which the thread that will use the resource is placed into a "ready" list accessible to the RTOS 102. Once in the ready list, the thread is run at an appropriate time as controlled by the RTOS. In accordance with some embodiments, threads may be assigned priorities and some threads may have higher priorities than other threads. Thus, in block 232 the RTOS 102 runs the thread placed into the ready list at 230 preferably when its priority is the highest priority of all other threads in the ready list. The power manager 104 may suspend a save/restore state job if a save/restore job with a higher priority comes along.

If, however, the resource is power managed as determined by decision 208, control passes to decision 210 in which the SWI POST code determines whether the thread that is to use the resource is ready to be run. If the thread is ready to be run, control passes to blocks 230 and 232 which are performed as explained above. If the thread is not ready to be run, control passes to decision 212 in which the SWI POST code determines whether the resource is powered on. If the resource is not powered on, then at 214 power is enabled to the resource. Once the resource is powered on, or if the resource was already powered on as determined at decision 212, control passes to decision 216 in which the SWI POST code determines whether the resource needs to have its state restored. If the resource does not require the restoration of its state, control proceeds to blocks 230 and 232 described above. If the resource does require its state to be restored, then the SWI POST code queues a direct memory access ("DMA") in block 218 to copy the resource's state back to the resource. The DMA operations may be prioritized (priority queued) so that thread priority inversion does not occur so that the power manager does not adversely affect scheduling priorities. If a restore job becomes queued that has a higher priority than the restore job in progress, the in-progress job will be suspended in favor of the higher priority job. The DMA process of course takes a finite amount of time to completely copy back all of the resource's state information. In block 220, while the DMA process is running, the SWI POST code sets the status of a flag to "not ready" to indicate that the DMA state restoration process has not completed and thus the resource is not ready yet for use. The SWI POST code then returns at 224.

When the DMA process completes, a DMA completion interrupt is asserted at 226 to re-enter execution of the SWI POST code. In block 228 the flag is set to the "ready" state to indicate that the resource's state has been restored. Control then passes back to block 206. Eventually, the SWI POST code determines at decision block 210 that the thread is ready and control passes to blocks 230 and 232.

In FIG. 3, an exemplary process 300 is shown in which the power manager 104 implements the predictive mode of enabling power to a processor resource. Process 300 preferably comprises three entry points 302, 320, and 330 into the code that implements the process. Entry point 302 is activated when the power manager 104 predictively determines that a presently powered down resource may need to be used in the near future. The method of how to predict future resource use varies from resource to resource and upon the overall system architecture and use. For example, the power manager 104 may be implemented to determine that a particular resource will be used after a certain period of time elapses following a predetermined event.

At 304, the power manager 104 determines whether the resource is already powered on. If the resource is not already powered on, the power manager causes the resource to be powered on at 306. After powering on the resource or after determining that the resource was already powered on, the power manager determines at 308 whether the resource needs to have its state restored. If no state is to be restored, control returns at 314. If the resource needs to have its state restored, control passes to 310 in which a DMA job is queued to begin retrieving the relevant state information for the resource. At 312, the power manager 104 sets the status flag to "not ready" to indicate that the resource is not yet ready for use. Execution then returns at 314.

Once the DMA job to retrieve the resource's state completes, the power manager is re-entered at 320 when a DMA completion interrupt is asserted at 322. The status flag is set to the "ready" state at 324 to indicate that the resource's state has been fully restored and the execution returns again at 326.

The third entry point 330 occurs when the application that is to use the resource asserts an application interrupt for the relevant resource (332). A SWI is posted at 334 and the SWI POST code is run at 336. At 338, the power manager determines whether the resource is power managed as described previously. If the resource is not power managed, control passes to 342 and 344 in which the thread that will use the resource is placed on to the ready list and the O/S runs the thread. If the resource is power managed, control passes to decision block 340 in which it is determined whether the thread is ready. If the thread is ready, control passes to blocks 342 and 344. Otherwise, control loops back on decision block 340 until the thread is ready to be run.

The implementations described herein permit the power manager 104 to hook into pre-existing scheduling functions, and preferably at a single point (where scheduling actions ultimately occur), versus multiple points in the OS code base where thread scheduling is initiated. This means that the kernel itself is not potentially destabilized by multiple modifications and maintenance points.

While the preferred embodiments of the present invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. For example, any suitable thread type besides SWIs, such as RTOS blockable tasks, can be used in place of the SWIs described above. Accordingly, the scope of protection is not limited by the description set out above. Each and every claim is incorporated into the specification as an embodiment of the present invention.

What is claimed is:

1. A method comprising:
    receiving a request for a resource within a semiconductor device;
    enabling power to said resource in response to receiving said request if power is not already enabled to the resource;
    determining whether state information should be restored to the resource; and
    performing a DMA process to restore the state information to the resource after enabling power if the state information should be restored.

2. The method of claim 1 further comprising determining whether power is already enabled to the resource.

3. The method of claim 1 wherein restoring the state information comprises initiating a direct memory access process to copy the state information to the resource.

4. The method of claim 3 further comprising assigning priorities to the direct memory access process.

5. A method, comprising:
   before a need for a resource arises, determining that the resource will be needed;
   enabling power to the resource if power is not already enabled to the resource;
   determining whether state information should be restored to the resource; and
   restoring the state information to the resource, via initiating a direct memory access (DMA) process to copy the state information to the resource, after enabling power if the state information should be restored.

6. The method of claim 5 further comprising determining whether power is already enabled to the resource.

7. The method of claim 5 wherein, following enabling power to the resource, the method comprises receiving a request for use of the resource.

8. A system, comprising:
   a processor;
   a plurality of resources contained in the processor;
   a power manager that runs on the processor and that receives a request for use of a resource, enables power to said resource in response to receiving said request if power is not already enabled to the resource, determines whether state information should be restored to the resource, and uses a DMA process to restore the state information to the resource after enabling power if the state information should be restored.

9. The system of claim 8 wherein the power manager determines whether power is already enabled to the resource.

10. The system of claim 8 wherein the power manager restores the state information by initiating a direct memory access process to copy the state information to the resource.

11. The system of claim 10 wherein direct memory access processes have assigned priorities and the power manager restores state information associated with a highest priority direct memory access process.

12. A system, comprising:
    a processor;
    a plurality of resources contained in the processor;
    a power manager that runs on the processor and that, before a need for a resource arises, determines that the resource will be needed and the power manager also enables power to the resource if power is not already enabled to the resource, determines whether state information should be restored to the resource, and restores the state information to the resource, via initiating a direct memory access (DMA) process to copy the state information to the resource, after enabling power if the state information should be restored.

13. The system of claim 12 wherein the power manger determines whether power is already enabled to the resource.

14. The system of claim 12 wherein, following enabling power to the resource, the power manager receives a request for use of the resource.

15. A storage medium that contains software and, when executed by a processor, said software dynamically manages power within the processor, the processor comprising a plurality of circuits, said software comprising:
    instructions that determine when a circuit with the processor is needed for use;
    instructions that determine whether the circuit already has power enabled to the circuit;
    instructions that cause power to be enabled to the circuit if power is not already enabled to the circuit; and
    instructions that, after enabling power to the circuit, cause state information to be loaded into the circuit using a DMA process.

16. The storage medium of claim 15 wherein the instructions that determine when a circuit is needed for use comprise instructions that receive a request for use of the circuit from an application running on the processor.

17. The storage medium of claim 15 wherein the instructions that determine when a circuit is needed for use comprise instructions that predict when the circuit will be needed for use before a request for the circuit is received.

18. The storage medium of claim 17 wherein the instructions that predict comprise instructions that read information from a configurable table that indicate when the circuit may be needed based upon other processor activity.

19. The storage medium of claim 15 wherein the software comprises instructions that save state information associated with a circuit and selectively disables power to the circuit when the circuit is not needed.

20. The storage medium of claim 15 wherein said software runs transparently to applications that use said circuits.

21. The storage medium of claim 15 wherein said software hooks scheduling functions at a single point.

* * * * *